United States Patent
Eldho et al.

(10) Patent No.: US 11,598,472 B2
(45) Date of Patent: Mar. 7, 2023

(54) CLAMP ON SEAL FOR WATER LEAKS

(71) Applicant: Halliburton Energy Services, Inc., Houston, TX (US)

(72) Inventors: Shanu Thottungal Eldho, Singapore (SG); Christopher M. Pelto, Carrollton, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 48 days.

(21) Appl. No.: 17/232,033

(22) Filed: Apr. 15, 2021

(65) Prior Publication Data
US 2022/0333716 A1    Oct. 20, 2022

(51) Int. Cl.
| | |
|---|---|
| *F16L 55/172* | (2006.01) |
| *F16L 3/08* | (2006.01) |
| *F16L 5/10* | (2006.01) |
| *F16J 15/06* | (2006.01) |
| *F16L 55/18* | (2006.01) |
| *F16L 55/175* | (2006.01) |

(52) U.S. Cl.
CPC ........... *F16L 55/172* (2013.01); *F16J 15/068* (2013.01); *F16L 3/08* (2013.01); *F16L 5/10* (2013.01); *F16L 55/175* (2013.01); *F16L 55/18* (2013.01)

(58) Field of Classification Search
CPC ..... F16L 55/17; F16L 55/1705; F16L 55/172; F16L 55/1725; F16L 3/08; F16L 5/10; F16J 15/068
USPC .......................................................... 138/99
See application file for complete search history.

(56) References Cited

U.S. PATENT DOCUMENTS

| | | | | |
|---|---|---|---|---|
| 799,623 | A | * | 9/1905 | Augensen ............. F16L 55/172 403/311 |
| 4,391,300 | A | | 7/1983 | Saylor et al. |
| 4,465,309 | A | | 8/1984 | Nimke et al. |
| 4,676,275 | A | * | 6/1987 | Hancock ............... F16L 55/172 138/156 |
| 7,661,481 | B2 | * | 2/2010 | Todd ....................... E21B 33/12 166/212 |
| 7,900,655 | B2 | * | 3/2011 | Morton .................. F16L 55/172 138/99 |
| 8,490,707 | B2 | * | 7/2013 | Robisson ............ E21B 33/1208 166/387 |
| 8,631,829 | B1 | * | 1/2014 | Bennett ................. B29C 66/532 138/104 |

(Continued)

FOREIGN PATENT DOCUMENTS

| | | | |
|---|---|---|---|
| WO | 2012093959 A1 | 7/2012 | |
| WO | WO-2019094044 A1 | * 5/2019 | ............. E21B 33/10 |

OTHER PUBLICATIONS

Internatioanl Search Report & Written Opinion in PCT/US2021/028227 dated Jan. 3, 2022.

*Primary Examiner* — Nicholas L Foster
(74) *Attorney, Agent, or Firm* — Barnes & Thornburg, LLP

(57) ABSTRACT

An apparatus and method for repairing broken, compromised, damaged or cracked conduits is provided. Conduits such as pipes and tubing may bear fluid flows therethrough. Often these conduits are damaged or compromised and begin leaking fluid. A clamp is provided that holds expandable metal securely about the outer circumference of the conduit. The expandable metal may react with any leaking fluid, such as water, thereby expanding and sealing the crack or otherwise seals the compromised conduit in a permanent manner.

17 Claims, 3 Drawing Sheets

(56) References Cited

U.S. PATENT DOCUMENTS

| | | | | |
|---|---|---|---|---|
| 11,047,203 B2* | 6/2021 | Fripp | ............... | E21B 33/1277 |
| 11,136,850 B2* | 10/2021 | Wellhoefer | ......... | E21B 33/1208 |
| 11,174,700 B2* | 11/2021 | Fripp | ................ | E21B 33/10 |
| 11,299,955 B2* | 4/2022 | Fripp | ................ | E21B 33/1208 |
| 11,326,420 B2* | 5/2022 | Cho | ................ | E21B 43/088 |
| 11,396,788 B2* | 7/2022 | Newton | ............. | E21B 33/1208 |
| 2007/0277979 A1* | 12/2007 | Todd | .................. | E21B 33/134 |
| | | | | 166/287 |
| 2010/0012215 A1* | 1/2010 | Morton | ............... | F16L 55/172 |
| | | | | 138/99 |
| 2014/0196887 A1 | 7/2014 | Hallundbæk | | |
| 2020/0325749 A1* | 10/2020 | Fripp | ............... | F16J 15/068 |
| 2020/0362224 A1* | 11/2020 | Wellhoefer | ......... | C09K 8/5086 |
| 2020/0370391 A1 | 11/2020 | Fripp et al. | | |
| 2021/0040810 A1* | 2/2021 | Evers | .................. | E21B 33/12 |
| 2021/0270093 A1* | 9/2021 | Fripp | ................ | E21B 17/1078 |
| 2021/0332673 A1* | 10/2021 | Fripp | ................ | E21B 41/0042 |
| 2021/0372527 A1* | 12/2021 | Fripp | ................ | E21B 19/16 |
| 2022/0049574 A1* | 2/2022 | Holderman | ......... | E21B 33/1212 |
| 2022/0049577 A1* | 2/2022 | Holderman | ......... | E21B 33/1285 |
| 2022/0112790 A1* | 4/2022 | Cho | .................. | E21B 43/108 |
| 2022/0178222 A1* | 6/2022 | Fripp | ................ | E21B 17/1021 |
| 2022/0186104 A1* | 6/2022 | Fripp | ................ | C09K 8/57 |
| 2022/0186579 A1* | 6/2022 | Pelto | ................. | E21B 33/127 |
| 2022/0195828 A1* | 6/2022 | Newton | ............. | E21B 33/1208 |

\* cited by examiner

CLAMP ON SEAL FOR WATER LEAKS

The present disclosure relates generally to an apparatus and method for patching breaks, openings or cracks in conduits such as tubing, pipes or similar devices that may be carrying fluid flows.

BACKGROUND

Conduits such as pipes or tubing may develop cracks or flaws that leads to loss of fluids that may be carried by the conduit. Often traditional methods for addressing such compromised conduits that are in service and bearing fluid transport often involve significant downtime of the service, significant time to repair, difficulty in accessing the compromised conduit for repair by traditional means, or may involve only temporary repair.

BRIEF DESCRIPTION OF THE DRAWINGS

The accompanying drawings, which are included to provide a further understanding of the disclosure, are incorporated in and constitute a part of this specification, illustrate embodiments of the disclosure and, together with the detailed description, serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
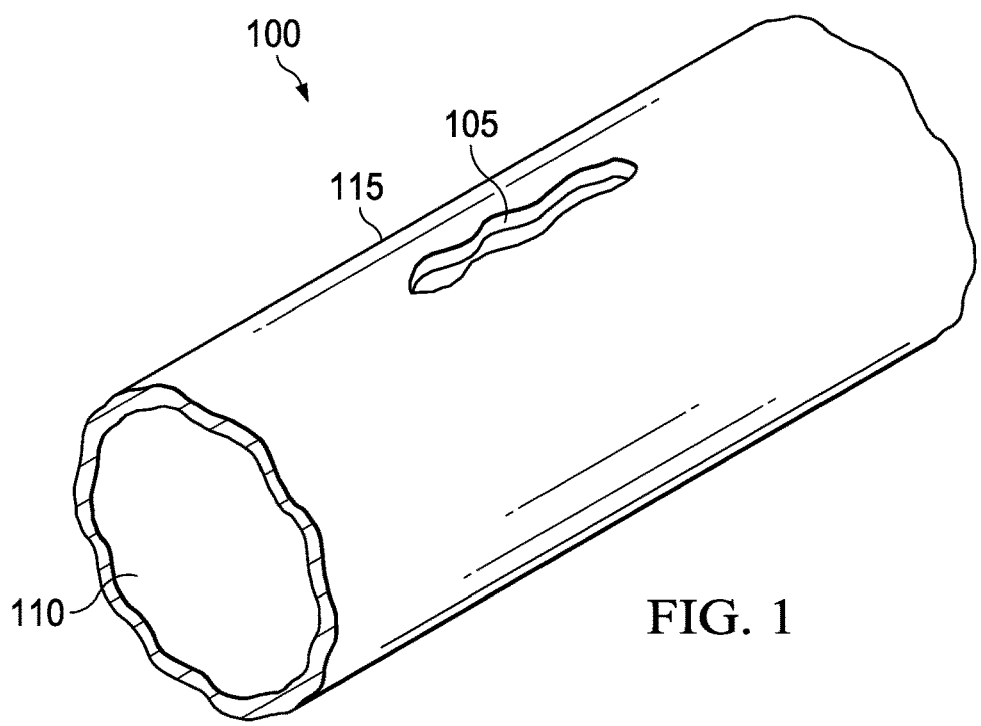
FIG. 1 is an illustration of an example conduit showing a crack in the outer wall.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms including, comprising and variations thereof, as used in this disclosure, mean including, but not limited to, unless expressly specified otherwise.

The terms "a", "an", and "the", as used in this disclosure, means "one or more", unless expressly specified otherwise. The term about, unless context indicates otherwise, refers to within +/−10%.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Overview

While the disclosure has been described in terms of example embodiments, those skilled in the art will recognize that the disclosure can be practiced with modifications in the spirit and scope of the appended claim and drawings. The examples provided herein are merely illustrative and are not meant to be an exhaustive list of all possible designs, embodiments, applications or modifications of the disclosure.

Conduits such as tubing or pipes may break, rust, crack or otherwise become compromised in its ability to bear fluid flows and leading to leakage. The fluid flow may be under pressure. Fixing such leaks can be tedious, difficult or temporary. A clamp is described herein that is configured to hold, in different embodiments, preformed expandable metal about an outer circumference of a conduit when repair to the conduit is required. The expandable metal may react with the fluid, such as water that may be leaking, and expands by chemical reaction forming a metal oxide to seal a leak due to the defect such as a crack, opening or break in the conduit. In this way, a permanent repair to the compromise conduit can be quickly applied without having to disassemble a conduit portion from another conduit portion, or without having to replace conduit sections. Typically, this is a more efficient and time saving approach for a repair, usually resulting in a permanent solution for a damaged conduit.

FIG. 1 is an illustration of an example conduit 100 showing a crack 105 in the outer wall 115. The conduit 100 may comprise any metal, metal alloy, composite or even plastic material. The crack 105 may represent any deformation or fault in the outer wall 115 that results in fluid leakage out of the conduit 100. Fluid may be carried within the interior passageway of the conduit 100. The conduit 100 may comprise, e.g., a pipe or tube, and may have any functional shape, not just the circular shape shown in FIG. 1. The crack 105 may be caused by stress, corrosion, wear, or a similar event. Any fluid carried within the conduit 100 through passageway 110 may then leak out of the conduit 100 through crack 105. A novel technique for repairing this crack 105, usually without need to stop fluid flow through the conduit 100, is described below.

Figure 2:
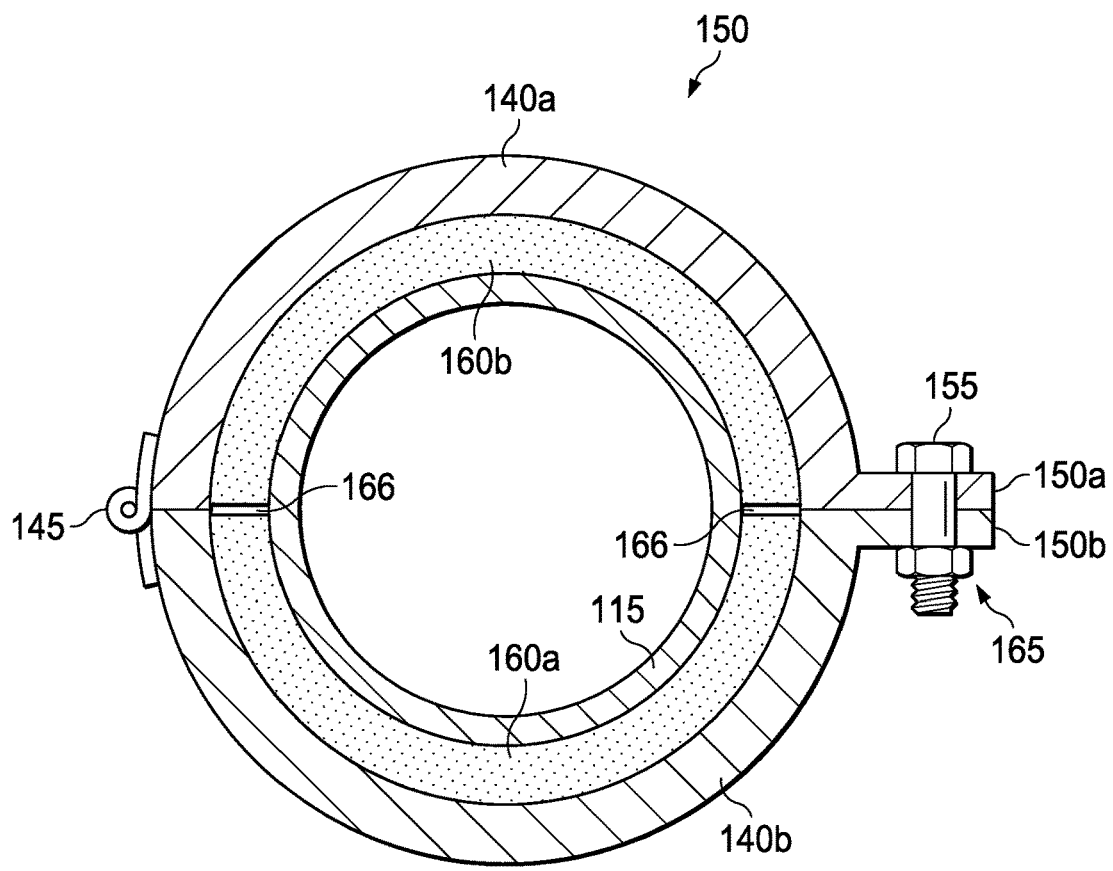
FIG. 2 is a cross-sectional diagram of clamp sections and expandable metal sleeve portions positioned about the conduit of FIG. 1, configured according to principles of the disclosure.
Figure 3:
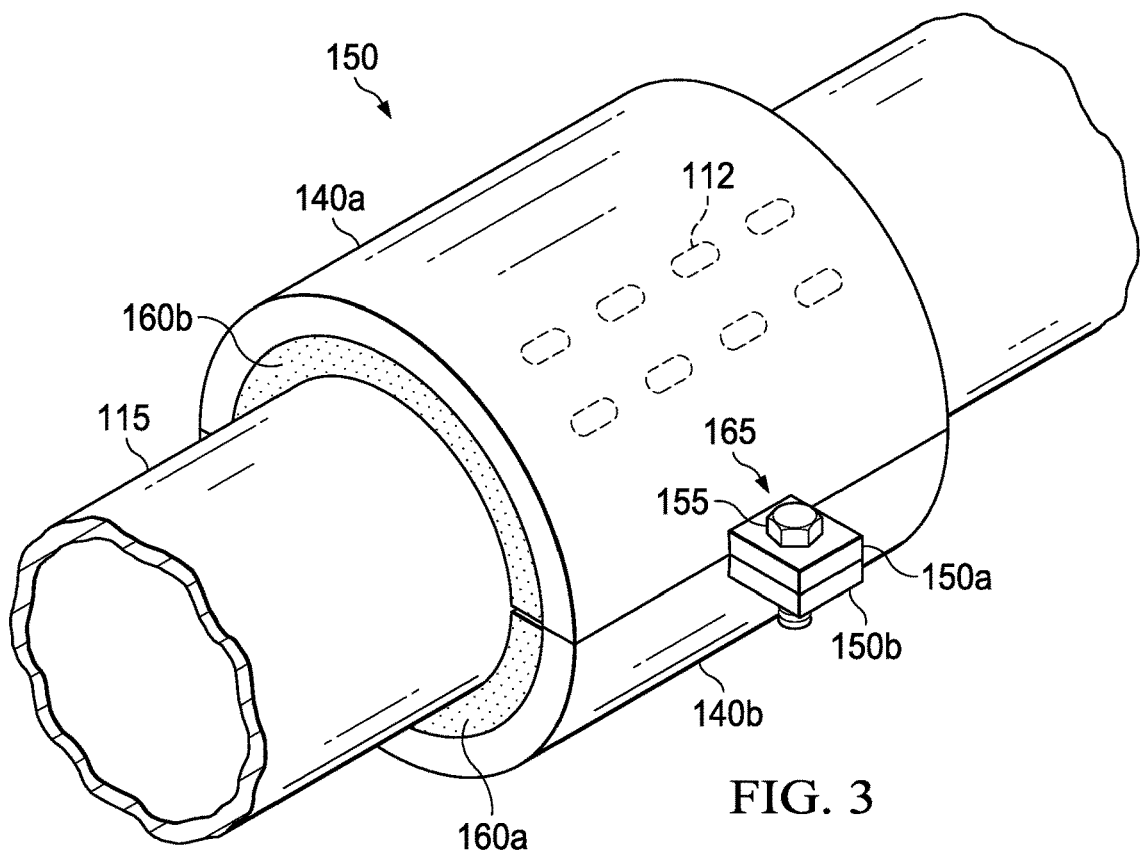
FIG. 3 is a perspective view diagram of FIG. 2.

FIG. 2 is a cross-sectional diagram of a clamp sections 140*a*, 140*b* and preformed sleeve portions 160*a*, 160*b* comprising expandable metal positioned about the outer circumference of the conduit 100 of FIG. 1, configured according to principles of the disclosure. FIG. 3 is a perspective view diagram of FIG. 2. The clamp sections 140a, 140b with preformed sleeve portions 160a, 160b together form an assembly 150 around the outer wall 115 of conduit 100 so that the inner wall of preformed sleeve portions 160a, 160b mate with the circumference of the outer wall 115. The clamp sections 140a, 140b also may be referred to as a first clamp section and a second clamp section, respectively. A securing flange portion 150a, 150b may be formed on each clamp section 140a, 140b, respectively, and extending laterally outwardly from each respective clamp section 140a, 140b. The preformed sleeve portions 160a, 160b comprising expandable metal may be referred to as a first preformed sleeve portion and a second preformed sleeve portion, respectively. In embodiments, clamp sections 140a, 140b may have a plurality of openings 112 through the wall of the clamp sections 140a, 140b. In use, the assembly 150 may be positioned and secured to cover the crack 105. The possible compositions of the expandable metal will be described further below.

The sleeve portions 160a, 160b comprising expandable metal may be preformed to substantially match the outer circumference of the conduit 100. The preformed sleeve portions 160a, 160b comprise a solid and sturdy object of expandable metal. When mated the ends of the sleeve portions 160a, 160b are in close proximity to each other as shown by space 166, and may actually touch one another. To repair a damaged conduit 100, the sleeve portions 160a, 160b may be placed within the clamp sections 140a, 140b, both sets of which are placed about the conduit 100 so that at least one of the sleeve portions 160a, 160b cover the crack 105. The sleeve portions 160a, 160b are each shown of about the same size as the other, but they may vary and be of unequal sizes, so long as they substantially mate to the conduit and the clamp sections, and cover the crack 105 in use.

The clamp sections 140a, 140b may be rotatably joined by hinge 145 on a first location of an end of each clamp section opposite a fastening mechanism 165 at a second position at another end of each respective clamp section. Clamp sections 140a, 140b may secure the sleeve portions 160a, 160b about the outer circumference of the conduit 100. The clamp sections 140a, 140b may be releasably secured by the fastening mechanism 165, such as, e.g., a bolt 155 through securing flange portions 150a, 150b of the clamp sections 140a, 140b. In embodiments, other types of fastening mechanisms may be employed. Moreover, in embodiments, there may be two fastening mechanisms 165, one of which may replace hinge 145. Further, different securing techniques may be employed instead, such as a pull-down type lever fastener, or a similar technique. As explained more below, hydrolysis causes at least one of the sleeve portions 160a, 160b comprising expandable metal to expand and seal the crack 105, providing a permanent repair. The sealing nature of the expandable metal may seal spaces 166 also.

Different sizes and shapes of sleeve portions 160a, 160b and matching different sizes and shapes of clamp sections 140a, 140b may be constructed and made available as needed for repairing different sizes and shapes of conduits. In embodiments, there may be at least one sleeve portion, but any number of sleeve portions may be employed, such as three or more portions. In embodiments, the thickness of the sleeve portions 160a, 160b comprising expandable metal prior to hydrolysis may be about 0.25 "to about 0.5" radially beyond the outer diameter of the conduit 100, but the thickness may vary.

Figure 4:
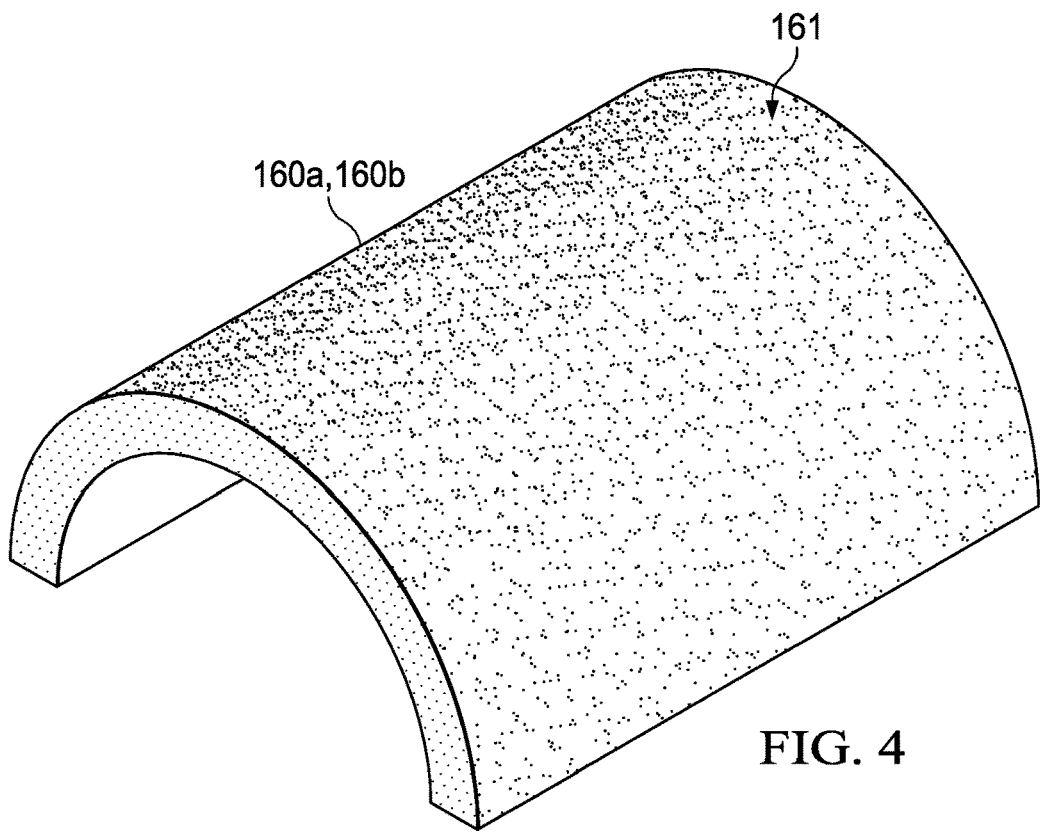
FIG. 4 is a diagram of an embodiment of an expandable metal sleeve for use with the clamp sections shown in FIGS. 2 and 3, configured according to principles of the disclosure.

FIG. 4 is a diagram of an embodiment of an sleeve portion 160a, 160b comprising expandable metal for use with the clamp shown in FIGS. 2 and 3, configured according to principles of the disclosure. The sleeve portion 160a, 160b is shown with a preformed shape, in this example, an inner surface having a curvature for mating with a curvature of an outer surface of a conduit 100. Moreover, the outer surface of the sleeve portion 160a, 160b may have same shape as the shape of the inner surface of clamp sections 140a, 140b. If other shapes are involved, such as, e.g., square conduits, the outer surface of the sleeve portion may have same square shape as the shape of the inner surface of square clamp sections, etc. Also shown in FIG. 4 is an optional adhesive layer 161. The adhesive layer 161 may be used to secure the sleeve portion 160a, 160b to the respective clamp section 140a, 140b for easier transport or easier assembly.

Figure 5A:
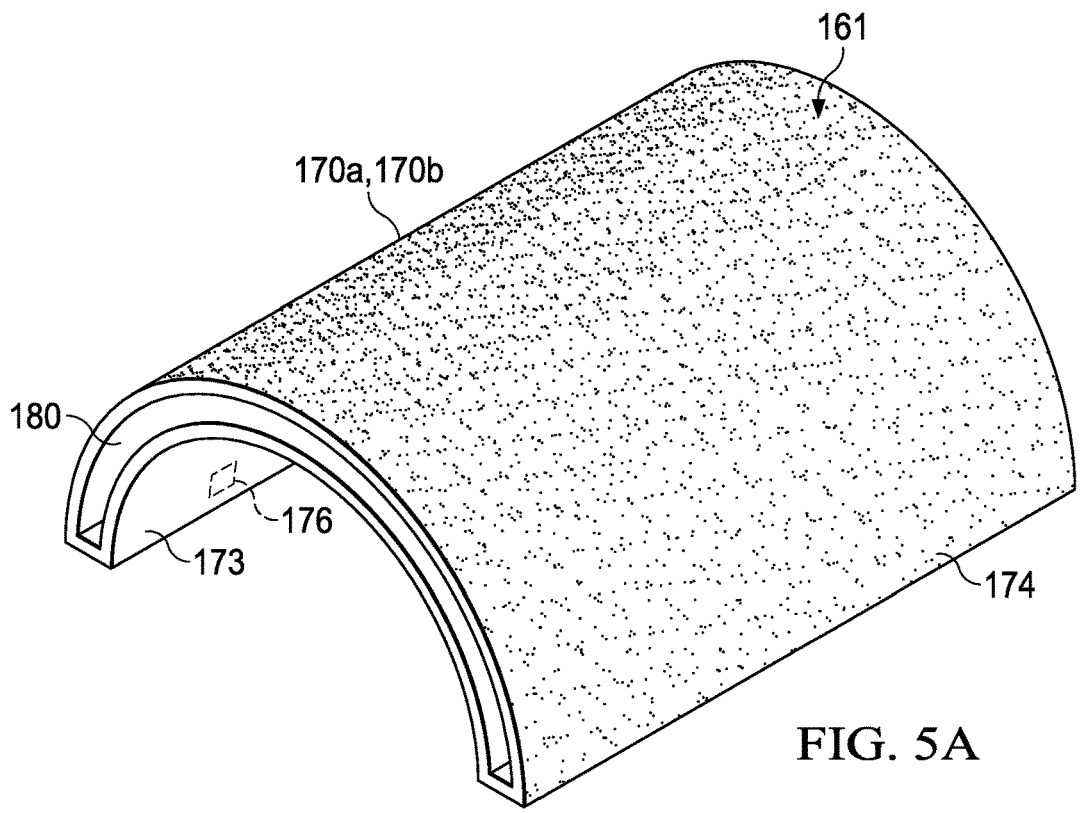
FIG. 5A is a diagram of an embodiment of a hollow containment device for containing granular expandable metal and for use with the clamp sections of FIGS. 2 and 3, configured according to principles of the disclosure.

FIG. 5A is a diagram of an embodiment of a hollow containment device 170a, 170b for containing granular expandable metal and for use with the clamp of FIGS. 2 and 3, configured according to principles of the disclosure. One or more preformed hollow containment devices 170a, 170b may be constructed to mate to respective clamping sections 140a, 140b and conduit 100 to function in a similar manner as the preformed sleeve portions 160a, 160b comprising expandable metal, and may also be considered a preformed sleeve portion comprising expandable metal, when filled with expandable metal in granular form. The hollow containment devices 170a, 170b comprises a hollow interior 180 that may be filled with expandable metal 175 (FIG. 5B) in granular form prior to positioning the hollow containment devices 170a, 170b within clamp sections 140a, 140b to seal a crack 105 in conduit 100. In effect, the hollow containment devices 170a, 170b are fitted and sized in a similar manner as the preformed expandable metal sleeve portions 160a, 160b and may be used in a similar manner. Different shapes and sizes, e.g., different radiuses, of hollow containment devices 170a, 170b may be provided. In certain applications, the hollow containment devices 170a, 170b may be an alternative option when considering stocking, shipping and intended use, as compared to the preformed expandable metal sleeve portions 160a, 160b. The hollow containment devices 170a, 170b permit the granular expandable metal 175 to be inserted through a re-closeable opening 176 in any of the walls 173 to fill the hollow interior 180 at any time before use.

Alternatively, the hollow containment devices 170a, 170b may be pre-filled with granular expandable metal 175 during a manufacturing stage without a need for a re-closeable opening 176. Moreover, the hollow containment device 170a, 170b may constructed from a degradable composition which upon contact with a fluid, such as water, dissolves or degrades permitting the fluid to contact the granular expandable metal 175 within the hollow containment devices 170a, 170b so that the hollow containment devices 170a, 170b expand and become a solid metallic seal for sealing crack 105. The hollow containment devices 170a, 170b may also include an adhesive 161 on outer wall 174 for easier attachment and holding to the respective clamping sections 140a, 140b. In embodiments, an adhesive may used on the inner wall 173. The adhesive may involve a peel-off type cover to expose the adhesive.

Figure 5B:
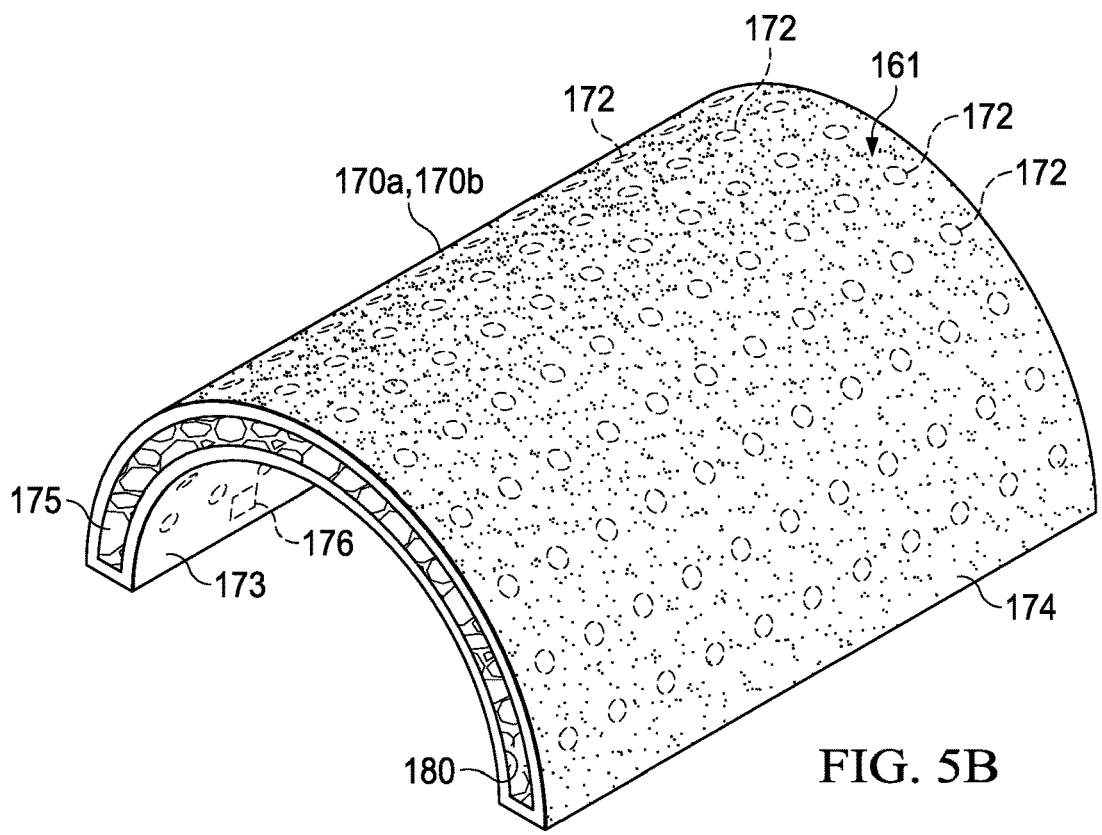
FIG. 5B is a diagram of an embodiment of a hollow containment device similar to FIG. 5A for containing granular expandable metal and for use with the clamp sections of FIGS. 2 and 3 while showing additional characteristics, configured according to principles of the disclosure.

FIG. 5B is a diagram of an embodiment of a hollow containment device 170a, 170b similar to FIG. 5A for containing granular expandable metal 175 in the hollow interior 180 and for use with the clamp sections 140a, 140b of FIGS. 2 and 3, but shows additional characteristics. Hollow containment devices 170a, 170b may also be considered a preformed sleeve portion comprising expandable metal, when filled with expandable metal in granular form.

The hollow containment devices 170a, 170b may be configured with openings 172 to permit fluid to flow into the hollow containment devices 170a, 170b so fluid reaches the granular expandable metal 175 causing a reaction via hydrolysis so that the granular expandable metal 175 expands to seal crack 105. The hollow containment devices 170a, 170b may be constructed from a degradable composition, but is not necessary if openings 172 are present. The openings would typically be smaller in diameter than individual granules of granular expandable metal 175 to retain the granules within the hollow containment devices 170a, 170b prior to use. Moreover, an adhesive 161 may also be used on outer wall 174, but in embodiments, may be used on the inner wall 173. The adhesive may involve a peel-off type cover to expose the adhesive.

The expandable metals described in relation to FIGS. 2-5B may be granulated, or may be machined to any specific size/shape, extruded, formed, cast or other conventional ways to produce the desired shape of an expandable metal sleeve portion 160a, 160b. For the expandable sleeve portion 160a, 160b herein, the expandable metal, pre-expansion, in certain embodiments has a yield strength greater than granulated or a dimension greater than about 1.25 mm (e.g., approximately 0.05 inches) thickness.

In general, and in relation to the previously described uses of expandable metals of FIG. 25B, the hydrolysis of any metal can create a metal hydroxide. The formative properties of alkaline earth metals (Mg—Magnesium, Ca—Calcium, etc.) and transition metals (Zn—Zinc, Al—Aluminum, etc.) under hydrolysis reactions demonstrate structural characteristics that are favorable for use with the present disclosure. Hydration results in an increase in size from the hydration reaction and results in a metal hydroxide that can precipitate from the fluid.

The hydration reactions for magnesium is:

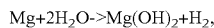

$Mg + 2H_2O \rightarrow Mg(OH)_2 + H_2$, where $Mg(OH)_2$ is also known as brucite. Another hydration reaction uses aluminum hydrolysis. The reaction forms a material known as Gibbsite, bayerite, and norstrandite, depending on form. The hydration reaction for aluminum is:

$Al + 3H_2O \rightarrow Al(OH)_3 + 3/2 H_2$.

Another hydration reactions uses calcium hydrolysis. The hydration reaction for calcium is:

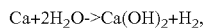

$Ca + 2H_2O \rightarrow Ca(OH)_2 + H_2$,

Where $Ca(OH)_2$ is known as portlandite and is a common hydrolysis product of Portland cement. Magnesium hydroxide and calcium hydroxide are considered to be relatively insoluble in water. Aluminum hydroxide can be considered an amphoteric hydroxide, which has solubility in strong acids or in strong bases.

In an embodiment, the metallic material used can be a metal alloy. The metal alloy can be an alloy of the base metal with other elements in order to either adjust the strength of the metal alloy, to adjust the reaction time of the metal alloy, or to adjust the strength of the resulting metal hydroxide byproduct, among other adjustments. The metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the alloy can be alloyed with a dopant that promotes corrosion, such as Ni—Nickel, Fe—Iron, Cu—Copper, Co—Cobalt, Ir—Iridium, Au—Gold, C—Carbon, gallium, indium, mercury, bismuth, tin, and Pd—Palladium. The metal alloy can be constructed in a solid solution process where the elements are combined with molten metal or metal alloy. Alternatively, the metal alloy could be constructed with a powder metallurgy process. The expandable metal sleeves 160a, 160b can be cast, forged, extruded, or a combination thereof.

Optionally, non-expanding components may be added to the starting expanding metal materials. For example, ceramic, elastomer, glass, or non-reacting metal components can be embedded in the expanding metal or coated on the surface of the expanding metal. Alternatively, the starting metal may be the metal oxide. For example, calcium oxide (CaO) with water will produce calcium hydroxide in an energetic reaction. Due to the higher density of calcium oxide, this can have a 260% volumetric expansion where converting 1 mole of CaO goes from 9.5 cc to 34.4 cc of volume. In one variation, the expanding metal is formed in a serpentinite reaction, a hydration and metamorphic reaction. In one variation, the resultant material resembles a mafic material. Additional ions can be added to the reaction, including silicate, sulfate, aluminate, and phosphate. The metal can be alloyed to increase the reactivity or to control the formation of oxides.

The expandable metal can be configured in many different fashions, as long as an adequate volume of material is available for fully expanding. Additionally, a coating may be applied to one or more portions of the expandable metal to delay the expanding reactions.

In use, the fluid required to cause hydrolysis reactions of the expanding metal, such as used with the embodiments of FIGS. 2-5B, may be a fluid being carried within the conduit 100 during normal operation. This fluid may be the hydration fluid necessary to cause the hydrolysis reaction of the expandable metal for sealing an opening or crack 105.

In other situations, the fluid being carried in normal operations within the conduit 100 may not be a suitable hydration fluid. In that event, the flow of fluid might be suspended and replaced temporarily with a suitable hydration fluid, such as, e.g., water or brine, to accomplish a hydrolysis reaction for expanding the expandable metals as described in relation to FIGS. 2-5B. Once the expandable metals have undergone hydrolysis and any crack sealed, resumption of normal fluid flow may occur.

In still other situation, exposure of the expandable metals in FIGS. 2-5B may be accomplished from the outside or exterior of the conduit 100. Application of a suitable hydration fluid may be accomplished by submersion the expandable metals used in FIGS. 2-5B, or may be accomplished by spraying or wetting of the expandable metals used in FIGS. 2-5B. In embodiments, the clamping sections 140a, 140b may themselves be configured with slots or openings 112 to permit entry of hydration fluid from the exterior of the clamping sections 140a, 140b so that hydration fluid may reach the expandable metal being held within the clamping sections 140a, 140b.

Aspects of the disclosure may further be described in the following clauses:

Clause 1: An apparatus for creating a seal on conduits, comprising:

a plurality of sleeve portions each having a radius and each comprising expandable metal that expands in response to hydrolysis; and a plurality of clamping sections each having a radius to mate with a respective one of the plurality of sleeve portions, wherein the plurality of sleeve portions are preformed to mate with an outer circumference of a conduit and the plurality of clamping sections are configured to secure the plurality of sleeve portions against the outer circumference of a conduit for sealing an opening in the conduit.

Clause 2: The apparatus of clause 1, wherein the plurality of sleeve portions comprise a plurality of preformed hollow containment devices each configured to contain the expandable metal in granular form that expands to form a solid metal in response to hydrolysis.

Clause 3: The apparatus of clause 2, wherein the plurality of preformed hollow containment devices are at least one of: degradable and configured with openings.

Clause 4: The apparatus of any one of clauses 2 or 3, wherein the plurality of preformed hollow containment devices each have at least one surface having an adhesive thereon for attaching the hollow containment device to a surface of a respective one of the plurality of clamping sections.

Clause 5: The apparatus of any one of clauses 2-4, wherein the plurality of clamping sections are configured with a fastening mechanism to secure the plurality of sleeve portions against the outer circumference of a conduit for sealing the opening in the conduit.

Clause 6: The apparatus of clause 1, wherein the plurality of sleeve portions each comprise preformed solid expandable metal prior to hydrolysis and expands in response to hydrolysis.

Clause 7: The apparatus of clause 6, wherein a thickness of the plurality of sleeve portions prior to hydrolysis range in thickness from about 0.25 inches to about 0.5 inches.

Clause 8: The apparatus of any one of clauses 1-7, wherein the expandable metal comprises any metal that creates a metal hydroxide in response to hydrolysis.

Clause 9: The apparatus of any one of clauses 1-8, wherein the expandable metal responds to hydrolysis provided by fluid flowing through an opening in the conduit thereby expanding and sealing the opening.

Clause 10: The apparatus of any one of clauses 1-8, wherein the expandable metal responds to hydrolysis provided by fluid provided external to the conduit.

Clause 11: An apparatus for creating a seal on conduits, comprising: an assembly comprising: a plurality of sleeve portions each comprising expandable metal that expands in response to hydrolysis; and a plurality of clamping sections with a hinge positioned between the plurality of clamping sections, and the plurality of clamping sections configured to align with a respective one of the plurality of sleeve portions, wherein the plurality of sleeve portions are preformed to align with an outer circumference of a conduit and the plurality of clamping sections are configured to secure the plurality of sleeve portions against the outer surface of a conduit for sealing an opening in the conduit.

Clause 12: The apparatus of clause 11, wherein the plurality of clamping sections further comprise a fastening mechanism to secure the plurality of clamping sections to one another and holding the plurality of sleeve portions against the conduit.

Clause 13: The apparatus of clause 11, wherein the plurality of sleeve portions comprise a plurality of preformed hollow containment devices each configured to contain the expandable metal in granular form that expands to form a solid metal in response to hydrolysis.

Clause 14: The apparatus of clause 13, wherein the plurality of preformed hollow containment devices are at least one of: degradable and configured with openings.

Clause 15: The apparatus of any one of clauses 13 or 14, wherein the plurality of preformed hollow containment devices each have at least one surface having an adhesive thereon for attaching the hollow containment device to a surface of a respective one of the plurality of clamping sections.

Clause 16: The apparatus of clause 11, wherein the plurality of sleeve portions each comprise preformed solid expandable metal prior to hydrolysis and expands in response to hydrolysis.

Clause 17: The apparatus of any one of clauses 11-16, wherein the expandable metal comprises any metal that creates a metal hydroxide in response to hydrolysis.

Clause 18: A method for creating a seal on conduits, comprising: providing a plurality of sleeve portions each comprising expandable metal that expands in response to hydrolysis; and providing a plurality of clamping sections to mate with a respective one of the plurality of sleeve portions, wherein the plurality of sleeve portions are preformed to mate with an outer circumference of a conduit and the plurality of clamping sections are configured to secure the plurality of sleeve portions against the outer circumference of a conduit for sealing an opening in the conduit.

Clause 19: The method of clause 18, wherein in the step of providing the plurality of sleeve portions, the plurality of sleeve portions comprise a plurality of preformed hollow containment devices each configured to contain the expandable metal in granular form.

Clause 20: The method of clause 18, wherein in the step of providing the plurality of sleeve portions, the plurality of sleeve portions each comprise preformed solid expandable metal prior to hydrolysis and expands in response to hydrolysis.

While aspects of the disclosure are described with reference to various implementations and exploitations, it will be understood that these aspects are illustrative and that the scope of the claims are not limited to them.

What is claimed is:

1. An apparatus for creating a seal on conduits, comprising:
    a plurality of sleeve portions each having a radius and each comprising expandable metal that expands in response to hydrolysis; and
    a plurality of clamping sections each having a radius to mate with a respective one of the plurality of sleeve portions,
    wherein the plurality of sleeve portions are preformed to mate with an outer circumference of a conduit and the plurality of clamping sections are configured to secure the plurality of sleeve portions against the outer circumference of the conduit for sealing an opening in the conduit,
    wherein the plurality of sleeve portions comprise a plurality of preformed hollow containment devices each configured to contain the expandable metal in granular form that expands to form a solid metal in response to hydrolysis.

2. The apparatus of claim 1, wherein the plurality of preformed hollow containment devices are at least one of: degradable and configured with openings.

3. The apparatus of claim 1, wherein the plurality of preformed hollow containment devices each have at least one surface having an adhesive thereon for attaching the hollow containment device to a surface of a respective one of the plurality of clamping sections.

4. The apparatus of claim 1, wherein the plurality of clamping sections are configured with a fastening mechanism to secure the plurality of sleeve portions against the outer circumference of the conduit for sealing the opening in the conduit.

5. The apparatus of claim 1, wherein the plurality of sleeve portions each comprise preformed solid expandable metal prior to hydrolysis and configured to expand in response to hydrolysis.

6. The apparatus of claim 5, wherein a thickness of the plurality of sleeve portions prior to hydrolysis range in thickness from about 0.25 inches to about 0.5 inches.

7. The apparatus of claim 1, wherein the expandable metal comprises any metal that is configured to create a metal hydroxide in response to hydrolysis.

8. The apparatus of claim 1, wherein the expandable metal is configured to respond to hydrolysis provided by fluid flowing through an opening in the conduit thereby expanding and sealing the opening.

9. The apparatus of claim 1, wherein the expandable metal is configured to respond to hydrolysis provided by fluid provided external to the conduit.

10. An apparatus for creating a seal on conduits, comprising:
    an assembly comprising:
        a plurality of sleeve portions each comprising expandable metal that expands in response to hydrolysis; and
        a plurality of clamping sections with a hinge positioned between the plurality of clamping sections, and the plurality of clamping sections configured to align with a respective one of the plurality of sleeve portions,
        wherein the plurality of sleeve portions are preformed to align with an outer circumference of a conduit and the plurality of clamping sections are configured to secure the plurality of sleeve portions against the outer surface of the conduit for sealing an opening in the conduit
        wherein the plurality of sleeve portions comprise a plurality of preformed hollow containment devices each configured to contain the expandable metal in granular form that expands to form a solid metal in response to hydrolysis.

11. The apparatus of claim 10, wherein the plurality of clamping sections further comprise a fastening mechanism to secure the plurality of clamping sections to one another and for holding the plurality of sleeve portions against the conduit.

12. The apparatus of claim 10, wherein the plurality of preformed hollow containment devices are at least one of: degradable and configured with openings.

13. The apparatus of claim 11, wherein the plurality of preformed hollow containment devices each have at least one surface having an adhesive thereon for attaching the hollow containment device to a surface of a respective one of the plurality of clamping sections.

14. The apparatus of claim 10, wherein the plurality of sleeve portions each comprise preformed solid expandable metal prior to hydrolysis and configured to expand in response to hydrolysis.

15. The apparatus of claims 10, wherein the expandable metal comprises any metal that is configured to create a metal hydroxide in response to hydrolysis.

16. A method for creating a seal on a conduit, comprising:
    providing a plurality of sleeve portions each comprising expandable metal that expands in response to hydrolysis; and
    providing a plurality of clamping sections mating with a respective one of the plurality of sleeve portions,
    wherein the plurality of sleeve portions are mating with an outer circumference of a conduit and the plurality of clamping sections secure the plurality of sleeve portions against the outer circumference of the conduit for sealing an opening in the conduit
    wherein in the step of providing the plurality of sleeve portions, the plurality of sleeve portions comprise a plurality of preformed hollow containment devices each containing the expandable metal in granular form.

17. The method of claim 16, wherein in the step of providing the plurality of sleeve portions, the plurality of sleeve portions each comprise preformed solid expandable metal prior to hydrolysis and expands in response to hydrolysis.

* * * * *